May 31, 1927.  1,630,307
H. Y. NORWOOD ET AL
APPARATUS FOR MEASURING AND INDICATING THE FLOW OF GASES
Filed Aug. 4, 1925
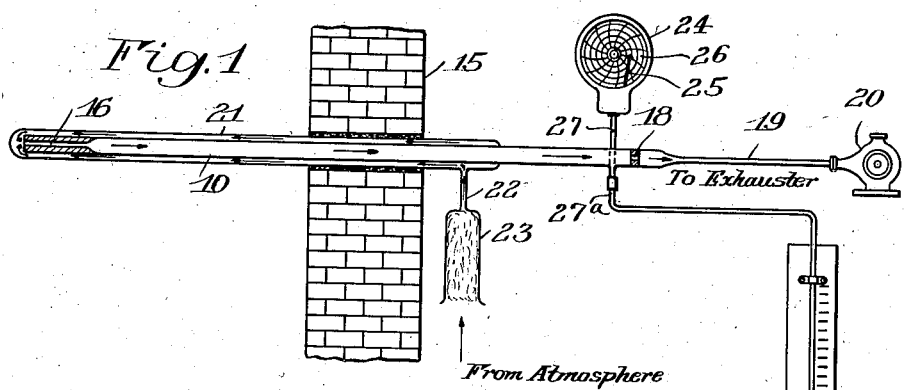
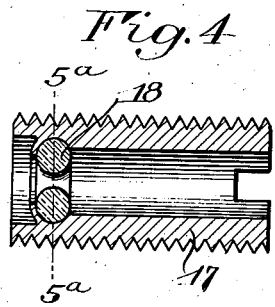
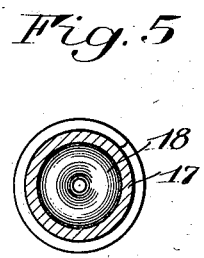
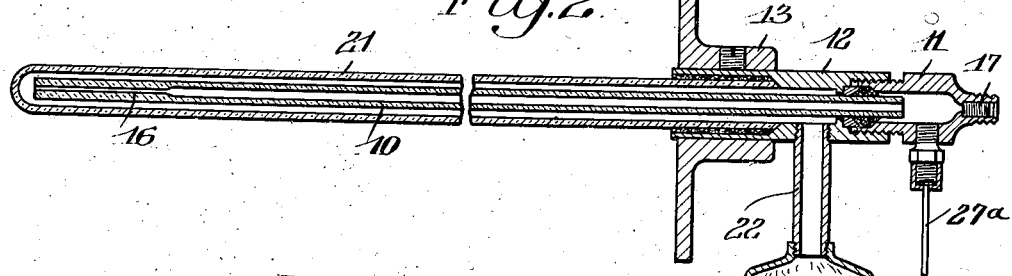
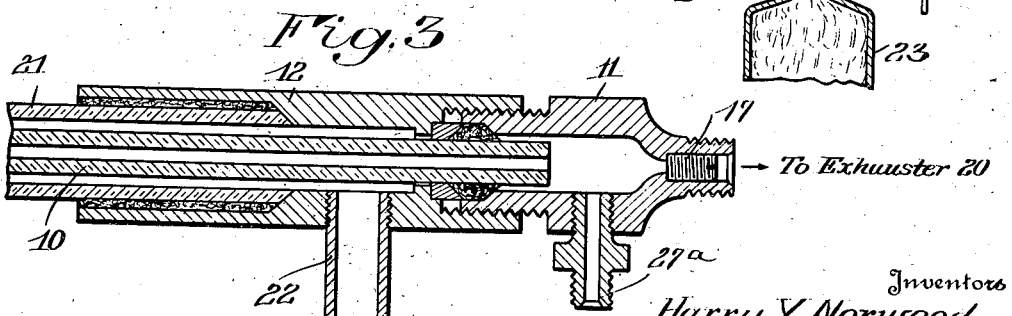
Inventors
Harry Y. Norwood
Kenneth L. Tute
By
their Attorney Patented May 31, 1927.

1,630,307

UNITED STATES PATENT OFFICE.

HARRY Y. NORWOOD, OF AVON, AND KENNETH L. TATE, OF ROCHESTER, NEW YORK, ASSIGNORS TO TAYLOR INSTRUMENT COMPANIES, OF ROCHESTER, NEW YORK, A CORPORATION OF NEW YORK.

APPARATUS FOR MEASURING AND INDICATING THE FLOW OF GASES.

Application filed August 4, 1925. Serial No. 48,170.

This invention relates to apparatus for measuring and indicating the flow of a gas, more especially as a function of some variable to be observed, such as the temperature, composition or other characteristic of gas, one object of the invention being to provide the combination with a simple and practical apparatus of this nature adapted to accurately measure gaseous flow independently of close regulation of the operating pressures, of mechanism for indicating the same on a dial in convenient terms such, for example, as those of the variable to be observed. Another object is the provision of such an apparatus in which use is made of the principle of "maximum flow" for eliminating in a simple manner the effect of fluctuations in the operating pressures, together with mechanism for continuously indicating and recording the desired variable. A further object is to provide an apparatus of the above character particularly adapted for indicating temperatures and more especially for use as a pyrometer.

To these and other ends the invention resides in certain improvements and combinations of parts, all as will be hereinafter more fully described, the novel features being pointed out in the claim at the end of the specification.

In the drawings:—

Figure 1 is an elevation, partly in section, of an apparatus embodying the present invention;

Figure 2 is an enlarged sectional view of parts shown in Figure 1;

Figure 3 is a further enlargement of a portion shown in Figure 2;

Figure 4 is an enlarged sectional detail of one of the restricted passages of the gas chamber, and Figure 5 is a sectional view on the line 5ª—5ª in Figure 4.

Similar reference numerals throughout the several views indicate the same parts.

The embodiment of the invention herein disclosed by way of illustation, represents an application of the same to the measurement of temperatures and more especially to pyrometric measurements, comprising in the present instance a tubular gas chamber 10, Figure 2, preferably constructed of porcelain or other heat resisting material. One end of this member or chamber is mounted and supported in one end of a metallic extension 11 which is in turn threadedly engaged and supported in one end of a sleeve 12 carried in a boss 13 of a plate 14 adapted to be attached to a support such as the wall 15, Figure 1, of a furnace, through which chamber 10 is adapted to project as shown for subjecting its opposite end to the temperature to be measured.

Chamber 10 is provided with restricted inlet and outlet passages, the inlet being in the present instance located at the end subjected to the temperature to be measured. This inlet passage is preferably in the form of a capillary bore for producing transpiratory flow of the gas in its passage therethrough. And this bore is formed in the present instance by reduction in the bore of the chamber adjacent its end, as shown at 16.

The other, and in the present instance, the outlet passage of the chamber, is provided at the opposite end of the bore of the chamber extension 11 and this outlet is preferably in the form of an effusion orifice. An advantageous form of construction for this orifice comprises a sleeve 17 threadedly engaged in the end of extension 11 and having mounted therein the orifice member proper, for which a center jewel 18, such as used in watches, having an opening of suitable diameter, has been found to serve advantageously.

The operating pressures for causing flow of the gas, in the present instance air, to the chamber are preferably obtained by subjecting the inlet passage to atmospheric pressure and connecting with the outlet passage a pipe 19 leading to an exhauster, or pump 20, adapted to maintain a partial vacuum of say 2 pounds per square inch or less, absolute. The supply of air for the chamber inlet is preferably obtained from room atmosphere, to which end chamber 10 is housed in a spaced outer chamber or porcelain sleeve 21, closed at its end adjacent the chamber intake 16. The other open end of sleeve 21 is mounted in the end of supporting sleeve 12, as shown, with the bore of which it communicates about the chamber 10. Connected with the bore of sleeve 12, as by means of a pipe 22, is a filter 23 of the usual or any suitable variety, located in the room atmosphere. It is apparent from this construction that air is drawn through the filter, sleeve 21, chamber inlet 16 and chamber outlet 18 to the pump. It is to be noted that the air in sleeve 21 and the transpiration inlet of the chamber 10 are subjected to the furnace temperature and that the chamber extends at its other end portion for a substantial distance through room atmosphere so that this portion and the outlet orifice are subjected to a known and substantially constant temperature. The air passes through the transpiration inlet therefore at furnace temperature and flowing thence more slowly through chamber 10, becomes cooled at the outlet orifice to room temperature, so that temperature influence on the flow through the outlet orifice is substantially constant.

In accordance with the principles of the transpiration of gases, the effect of increased temperature upon the flow through the capillary inlet bore of the chamber tends to reduce such flow and hence to reduce the pressure in the chamber. The latter is therefore a function of the temperature to be observed, or in other words a temperature sensitive pressure.

It is essential, however, for utilizing the chamber pressure for measuring the transpiration temperature, that the difference in pressures to which the ends of the transpiration bore and hence the chamber are subjected be maintained independent of variations in the external operating pressures, or in other words in the partial vacuum to which the outlet is externally subjected. This is effectively accomplished in a simple manner by the present invention through the use of an outlet orifice constructed or proportioned relative to the inlet, so as to maintain a difference in pressure on the opposite sides of the orifice adapted to utilize the known principle of "maximum flow" through the latter. That is to say, if the external pressure on the orifice, or the partial vacuum, be maintained less than one-half substantially, or more precisely less than .53 of the pressure in the chamber, a maximum or constant flow occurs through the orifice, independently of fluctuations in the partial vacuum within the range stated. The dimensions of the parts will obviously vary with variations in structure and use within the principles defined. As merely illustrative in this respect, it may be stated that successful application to pyrometric work has been made with a transpiration bore 2 inches long and .037 inches in diameter and an outlet orifice .021 inches in diameter, giving a substantial variation in chamber pressure for the working range of temperatures. The invention thus obviates the necessity for close regulation of the operating pressures, which has been found a serious practical defect in prior apparatus of this class. The invention further provides for eliminating the influence of barometric changes upon measurement of the chamber pressure by the arrangement of the measuring apparatus as hereafter described.

The invention provides the combination with such an apparatus of indicating means for conveniently indicating, at any time, the pressure in the chamber, in terms of the desired variable of which it is a function, such as the furnace temperature. Such indicating means preferably comprises a recording mechanism, in the present instance a pressure recording instrument of the known variety represented at 24 having a pressure responsive flexible tube or diaphragm movable responsively to a pressure applied interiorly thereto for correspondingly moving a pen 25 over a time driven dial or chart 26, as well understood in the art. As the construction of the recording instrument may be of any of the various types well known in the art, a detailed description of the same is unnecessary. The pressure responsive element or container of the instrument is connected directly as by means of a branch 27 of a pipe 27ª with chamber 10 as shown and it is apparent from this arrangement that barometric variations are impressed upon the pressure sensitive element of the instrument 24, both externally by the atmosphere and internally through the chamber and pipe 27, so that such changes counterbalance and compensate for each other without affecting the accurate recording by the instrument of the substantially independent temperature sensitive pressure of the chamber 10. The recorder chart however is preferably marked to read directly in terms of the temperature to be measured.

The indicating means comprises also an indicating device of relatively large scale adapted to be observed from a distance, so that a furnace or other temperature, for example, may be conveniently watched from any position in the furnace room or other room in which an attendant may be stationed and so that comparatively small variations may be readily observed even from a distance. It has been found that this can be effectively accomplished by connecting tube 27ª with a glass tube 28 dipping at its lower end into a container 29 below a liquid level therein subjected to atmospheric pressure. The reduction in pressure in chamber 10 causes a liquid column to rise in the tube to a height proportional to the pressure in chamber 10 or in other words to the temperature to be observed. By employing a tube of substantial diameter of bore, with a relatively light liquid adapted to rise to a substantial height, and providing a suitable scale 30 for the tube, reading directly in temperatures, an indicating device is obtained of such a nature that comparatively small changes of temperature may be easily and quickly observed at a considerable distance from the device so that close watch of the temperature is greatly facilitated. The invention thus affords a simple, practical and efficient apparatus of the gaseous flow type for accurately indicating and recording in a continuous manner the temperature to which the apparatus is subjected and in terms of which the instrument dial or chart 26 is directly marked, and while the invention has been described in connection with the present embodiment as applied to the measurement of temperature, it is equally applicable to the measurement of other variables of which the gaseous flow or chamber pressure is a function.

We claim as our invention:

In apparatus for measuring temperatures, the combination of a manometric tube connected at one end to a body of liquid, a chamber having a capillary inlet and an effusion orifice outlet, means for maintaining a partial vacuum on the exterior of the outlet and a connection between the chamber and the manometric tube, the outlet orifice and the inlet being so proportioned that the external pressure on the orifice is less than .53 of the pressure in the chamber.

HARRY Y. NORWOOD.
KENNETH L. TATE.